United States Patent
Klein et al.

[15] 3,641,399
[45] Feb. 8, 1972

[54] CLUSTER ANODE FOR ELECTROLYTIC CAPACITORS

[72] Inventors: Gerhart P. Klein, Manchester; Ivan L. Wingood, Bedford, both of Mass.

[73] Assignee: P. R. Mallory & Co. Inc., Indianapolis, Ind.

[22] Filed: June 10, 1970

[21] Appl. No.: 44,927

[52] U.S. Cl.................................................317/230, 136/6
[51] Int. Cl. .........................................................H01g 9/04
[58] Field of Search ..........................317/230, 231, 232, 233

[56] References Cited

UNITED STATES PATENTS

| | | | |
|---|---|---|---|
| 2,299,228 | 10/1942 | Gray et al. ...............................317/230 |
| 2,406,345 | 8/1946 | Brennan .................................317/230 |
| 2,444,914 | 7/1948 | Brennan .................................317/230 |
| 3,166,693 | 1/1965 | Haring et al. ..........................317/230 |
| 3,286,136 | 11/1966 | McLean..................................317/230 |
| 3,302,073 | 1/1967 | Broodo...................................317/230 |

*Primary Examiner*—James D. Kallam
*Attorney*—Richard H. Childress, Robert F. Meyer and Henry W. Cummings

[57] ABSTRACT

The application describes a film-forming metal anode preferably tantalum made from microporous droplets with interdroplet spaces that facilitate the penetration of the anodes by processing materials. Capacitors made from such anodes exhibit one or more of the following characteristics; improved DC leakage, lower DF, improved wide frequency characteristics.

15 Claims, 4 Drawing Figures

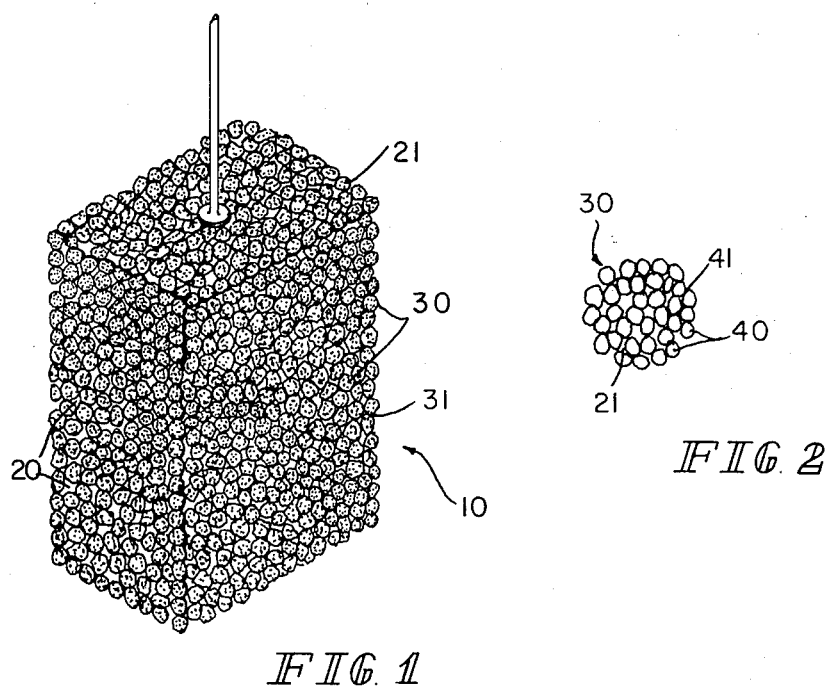
FIG. 1
FIG. 2
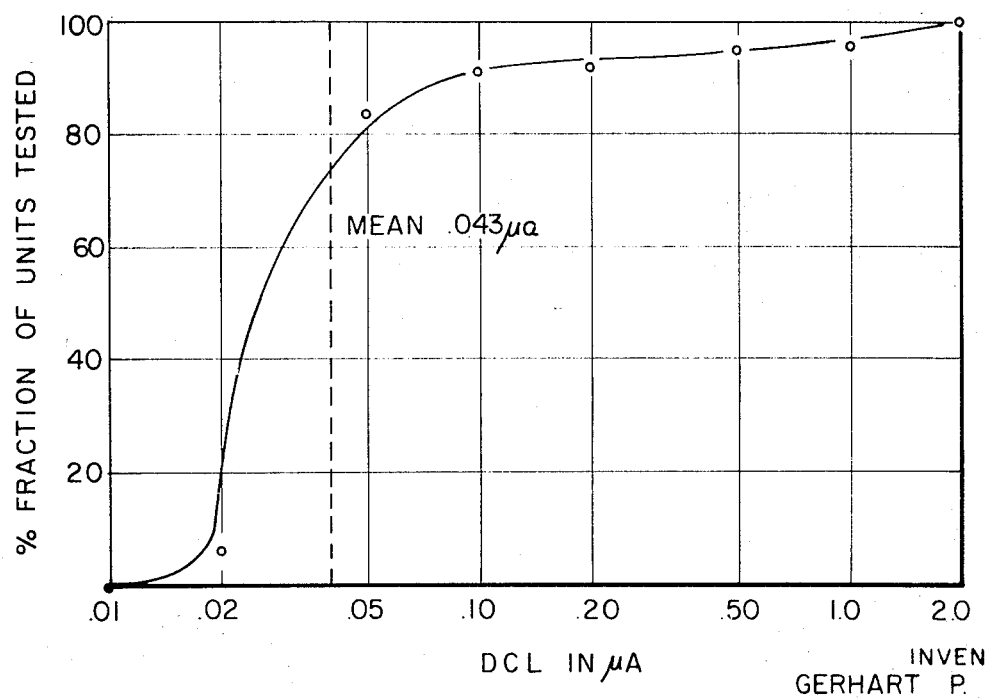
DISTRIBUTION OF DCL
FIG. 3
INVENTORS
GERHART P. KLEIN
IVAN L. WINGOOD

CLUSTER ANODE FOR ELECTROLYTIC CAPACITORS

Anodes for capacitors are commonly made by pressing powder into cylindrical shapes and sintering at elevated temperatures (in the vicinity of 2,000° C. for tantalum) in either an inert atmosphere or vacuum. The anode is then anodized by immersion in a suitable electrolyte and the application of a positive potential with respect to a counter electrode. In the case of a wet electrolytic capacitor, contact is made by means of a highly conducting electrolyte, whereas in the case of a solid electrolyte capacitor, contact is made by means of solid electrolyte, such as manganese dioxide which is deposited pyrolytically in the pores of the anode.

The porous nature of the anodes creates processing problems which increase in seriousness with the size of the anodes. Anodization which is carried out in electrolytes of low-conductivity leads to significant changes in hydrogen ion concentration inside the anode.

At the same time considerable amounts of thermal energy are generated. All heat and mass exchange between the internal structure of the anode and the electrolyte surrounding the anode takes place respectively by heat conduction to the outer anode surface and diffusion and migration due to concentration and potential gradients between the inside of the anode and the surrounding electrolyte. This limits the rate at which the anodic oxide film can be generated and the maximum voltage that can be reached safely. Voltage breakdown and crystallization of the oxide film occur more readily the higher the electrolyte concentration and the temperature. This leads in effect to an inverse relationship between the diameter of cylindrical anodes and the maximum voltage that can be reached at a given rate of oxide formation, i.e., the larger the diameter, the lower the voltage.

In the subsequent process step of pyrolytical deposition of manganese dioxide by first impregnating the anode with a solution of manganese nitrate and then converting it in air to $MnO_2$, it has been observed that it becomes increasingly difficult to properly impregnate the larger anodes. The number of conversion cycles required to effect good filling of all parts of the anode becomes too large.

In the subsequent process operation of reanodization, dissipation of heat inside the anode becomes of even greater importance, as defective sites resulting from localized heating inside the anode are likely to lead to catastrophic breakdown of the dielectric oxide.

All of these observations lead to the conclusion that the fabrication of high-voltage capacitors becomes increasingly difficult as the diameter of cylindrical anodes increases and the pore size decreases, other parameters being the same.

The electrical characteristics of the finished capacitor also depend on the diameter of the anode as well as the degree and type of porosity. Both capacitance and dissipation factor become more and more frequency dependent with increasing diameter of the anode and decreasing pore size. The ohmic series resistance of each capacitive element in the porous structure of the anode depends on its location and distance from the outer contact surface of the anode. In practice, this leads to dissipation factors increasing with the diameter of the anode, and a loss of capacitance with increasing frequency, all other variables being constant.

Conventionally, tantalum anodes for use in electrolytic capacitors are made by pressing tantalum powder mixed with binders such as stearic acid into cylindrical shapes, presintering the green pellets in vacuum while at the same time removing the binder, and finally sintering the presintered pellets in vacuum. Leads are usually pressed into the anode, however, in some cases the leads are welded to the presintered pellet.

One method of fabricating capacitor anodes involves filling cavities in rubber molds with wet powder, freezing and presintering said pellets, placing said pellets on a valve metal belt and passing said belt with said anodes through a sintering furnace flushed with inert gas such as argon. The anodes may be removed from the belt after the presintering step and leads may be welded to the presintered anode before the final sintering step.

In another method, a dispensing apparatus is utilized which permits the dispensing of small droplets of wet valve metal powder. These droplets are dispensed either directly onto suitable valve metal foil substrates and processed, or they may be dispensed into liquid nitrogen or a similar cold medium where they freeze. The frozen droplets may then be handled as desired and/or placed on foil substrates as described before.

In this connection U.S. Pat. Nos. 3,456,694 and 3,472,515 are hereby incorporated into the present application by reference and expressly made a part hereof.

The method of making cluster anodes according to the present invention is a combination of several aspects of the processes mentioned above. However, the process description given here should not be considered limiting as other methods of making the cluster anodes of the present invention may be used.

It is an object of the present invention to provide a capacitor anode in which the forming electrolyte can penetrate more readily into the anode.

It is an object of the present invention to provide a capacitor anode in which solid electrolyte forming reagents can penetrate more readily into the anode.

It is another object of the present invention to reduce or avoid crystallization of the oxide film during anodization.

It is another object of the present invention to increase the effective pore size of film-forming anodes.

It is another object of the present invention to provide anodes in which higher formation voltage can be reached during formation.

Another object of the present invention is to provide higher voltage capacitors.

Another object of the present invention is to provide a process in which fewer conversion coats are required to obtain the same result.

Another object of the invention is to provide capacitors in which the ratio of dry capacitance of finished device to wet cell capacitance is higher than with conventional units.

It is another object of the present invention to provide a solid electrolytic capacitor which has a less rapid increase in dissipation factor with increase in frequency.

It is another object of the present invention to provide a capacitor which exhibits less rapid loss of capacitance with increasing frequency.

It is another object of the present invention to provide a capacitor which exhibits less series resistance.

Other objects will be apparent from the following description and drawing.

FIG. 1 is a perspective view of the cluster anode of the present invention.

FIG. 2 is an enlarged section view of one of the agglomerate members in the cluster anode of the present invention.

FIG. 3 is distribution plot of DC leakage against fraction of units tested.

Figure 4:
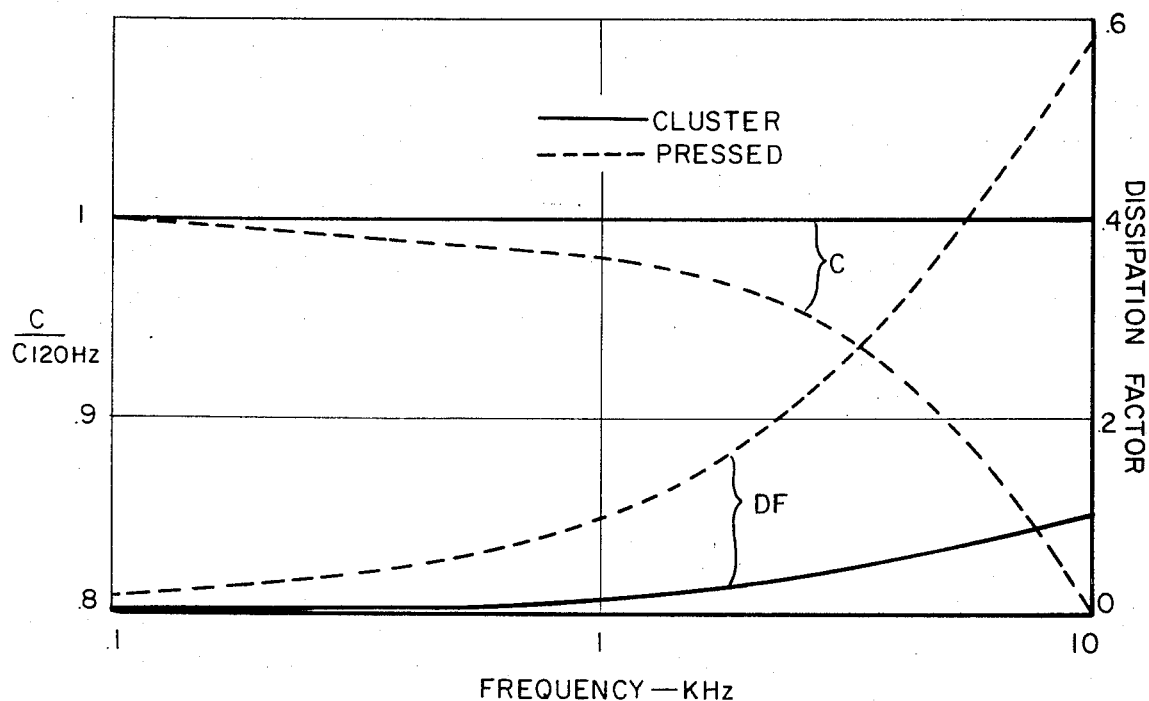
FIG. 4 is plot of frequency against capacitance and dissipation factor.

In accordance with the present invention, it has been found that the foregoing objects are achieved with the cluster anode structure of FIG. 1.

The cluster anode is composed of a plurality of agglomerate members 30 bonded together at least partially at the surface 31 of the agglomerates 30. The agglomerates 30 are in turn composed of a mass of particles or powder 40 bonded together at least partially at the surface thereof 41, as shown in FIG. 2.

A network of interconnecting pores of large diameter 20 penetrate into the pellet structure of fine pores 21. The combination of large pores 20 and fine pores provide more direct access from the outside of the anode to the particulate members 40.

It will be apparent that in the cluster anode of the present invention, while the pores 20 and 21 provide for electrolyte access, at the same time, powder members 40 result in a large surface area and a high capacitance per unit volume. It will also be apparent that the cluster anode provides low-resistance paths from any point in the interior of the device to the surface. This results in improved properties at high frequency.

The cluster anode of the present invention may be made of any of the film-forming metals including tantalum, niobium, titanium, zirconium, and aluminum. However, the preferred material is tantalum.

The size of particles 40 is subject to wide variation; however, they are generally within the range of about 1 to 100 microns, preferably 1 to 50 microns, most preferably 2 to 20 microns.

Likewise, the size of resulting agglomerates 30 may vary widely, for example 0.005–0.1-inch, preferably 0.01–0.05-inch diameter. For tantalum the agglomerates may weigh 0.01–1.0 grams, preferably 0.02–0.10 grams.

One method of making cluster anodes is as follows: First agglomerates are prepared with a defined water content. Secondly, the cluster anode is made by filling a cavity in an elastomeric mold for example rubber with agglomerates, thawing them, allowing them to coalesce partly, refreezing them, removing the cluster from the mold, and then placing it on a noncontaminating metal belt for sintering.

Preparation of agglomerates referred to above can be done for example by the following methods. Small droplets of wet tantalum powder are dispensed from a dispensing apparatus into liquid nitrogen and frozen. Alternatively they may be dispensed onto a belt, partially dried to a water content of 4 to 8 preferably 6±0.5 percent (by weight), and then frozen by passing the belt through a cold chamber. The size of the droplets prepared by this method is limited by the method of dispensing the powder slurry. The weight range, typically, would be 0.010–0.10 grams, in the case of 10 micron powder.

Alternatively, agglomerates are made by filling cavities in an elastomeric, preferably rubber mold with a water powder slurry, drying the wet powder to a water content of 4 to 8, preferably 6±0.5 percent (by weight), freezing the wet powder in the mold, followed by removing the frozen agglomerates from the mold. No size limitation exists in this method as the rubber molds can be made to any size. Preferred agglomerate size is between 0.01 and 0.10 grams for tantalum.

In the preparation of clusters, frozen agglomerates are placed in cavities in elastomeric molds, the particles are allowed to thaw and coalesce to the proper degree. The degree of coalescence depends on the water content as well as external vibration applied to the mold after the particles have been thawed.

The addition of a small amount of water to the cavities may help partial coalescence. After this has taken place, the agglomerates are dried further to a water content of 3 to 7, preferably 5±0.5 percent (by weight) and then frozen again in a cold chamber, such as obtained with liquid nitrogen. The frozen agglomerates are then removed from the mold, placed in cold storage, or directly placed on a film-forming metal belt i.e., tantalum for presintering. After presintering leads are attached by welding, followed by final sintering. Temperatures and times for sintering will vary with the film-forming metal used. For example, in the case of tantalum temperatures of 2,000° to 2,200° C. for 10 to 60 minutes, preferably 2,100° to 2,200° C. for 15–30 minutes, may be used.

The method of forming a dielectric oxide is not critical and known techniques may be utilized. For example an electrolyte of phosphoric or sulfuric acid may be used at a temperature from 70° to 100° C. at a current density of 5 to 25 milliamps per gram. A specific example is 0.1% $H_3PO_4$; 85° C.; current density 15 ma./gram.

Capacitors utilizing the cluster anode of the present invention may be of either the solid or wet-electrolyte-type. For the solid type manganese dioxide is the preferred electrolyte. Wet electrolytes include acids such as sulfuric, phosphoric, halides, such as lithium chloride solution. Sulfuric acid is preferred. Can materials include silver, gold, copper and alloys thereof or bi-metals of such metals with stainless steel. Silver may be used as backing for gold. Known cathodic materials, known seal structures and appropriate leads are used to complete the capacitor of the present invention.

The anodes of the present invention can be processed into solid and wet capacitors with particularly improved characteristics. At the same time, processing these anodes is facilitated because of the reduction of mass and heat transfer problems over conventional anodes. Some or all of the following advantages are obtained.

1. The inter anode spaces provide for better exchange of electrolyte between the inner sections of the anode and the bulk of the electrolyte during formation. The build up of hydrogen ion concentration is minimized.
2. Improved electrolyte circulation leads to better heat transfer from the inner parts of the pellet to the bulk of the electrolyte, thus reducing the danger of thermal damage. Anodization to higher voltages and higher formation rates becomes possible.
3. The impregnation of the anode with electrolyte formation solution such as manganese nitrate is improved due to a more open pore structure. A lower number of impregnation-conversion cycles are required; as few as 5–6 cycles can often be used instead of 9–10 for a conventional anode.
4. Fewer capacitors are lost during reformation because of better coverage during thermal conversion to manganese dioxide.
5. Aquadag, colloidal graphite and silver coatings can penetrate partially into the anode, thus reducing the series resistance of the finished capacitor; often to as low as 1.0–1.5 ohms, as compared to 1.6–3 ohms.
6. A larger percentage of the available surface area is covered with $MnO_2$, thus a higher percentage of available capacitance is realized.
7. Dissipation factors are lower than for comparable anodes of standard shape and size, for example 0.80 percent as compared to 2.5 percent at 120 C. sec.$^{-1}$.
8. DC leakage current values are lower because of reduced thermal damage during processing. Average of below 0.05 $\mu$a. as compared to 1–2$\mu$a.

For example, see FIG. 3 in this regard. More than 80 percent of the units had DC leakage of not more than 0.5 $\mu$a. for capacitors rated at 22 $\mu$f and 50 v.

9. The capacitance falls off more slowly with increasing frequency than with standard anodes. For example, $C_{10KH_2} \geq C_{120OH_2}$
10. The dissipation factor increases more slowly with increasing frequency than with standard anodes; for example $DF_{10KH_2}/DF_{120OH_2}$ is almost always below 10. Also $DF_{1KH_2}/DF_{120OH_2}$ is almost always below 2.

EXAMPLE 1

1. Frozen tantalum droplets (powder weight for example 10–50 mg.) are prepared for example as described in U.S. Pat. No. 3,456,694 by dropwise dispensing of wet droplets having a water content of about 12 percent onto a belt, predrying, and freezing in liquid nitrogen.
2. A rubber mold with cavities having a size of 0.2×0.2×0.4 inches are filled with the frozen droplets. The droplets are allowed to thaw briefly so that the pellets fuse or merge somewhat. The pellets are then predried some more and are then frozen again.
3. The frozen pellets are removed from the rubber mold and stored at low temperatures for example no higher than about −10° C., with liquid nitrogen as the storage medium.
4. The frozen pellets are placed on a tantalum belt, allowed to thaw and dry, and passed on the belt through an inert gas flushed, presintering furnace.
5. The presintered pellets are removed from the belt and leads are attached to them by welding.
6. A final sintering operation follows which is carried out by heating in vacuum to about 1,800° to 2,150° C.

7. Formation of the dielectric oxide was carried out to 150 volts in 0.1 percent phosphoric acid at 85° C. and a current density of 15 ma./gm.
8. Stabilization was carried out 30–120 minutes at 150 v. for a time of 75 minutes.
9. Manganese dioxide application was carried out with six conversion coats of $MnO_2$. Manganese nitrate solution was used with specific weight of 1.33 g.cm.$^{-3}$ at a conversion temperature of 250°–300° C.
10. Reformations were carried out after the first $MnO_2$ coat; to 90 v. at 85° C. in dilute propionic acid solution; after the second and last $MnO_2$ coat to 75 v., with the same solution.
11. Cathode coatings were applied, first colloidal graphite, and then silver paint in the usual manner to complete the device.
12. The resulting properties of these capacitors are compared to those of conventionally made solid tantalum capacitors of the same size and capacitance rating in the following table. (General Radio 1608A Impedance Bridge was used)

COMPARISON OF PROPERTIES FOR CLUSTER AND REGULAR PRESSED ANODES

| Capacitor rating 22 µf. 50 v. | Pressed | Cluster |
|---|---|---|
| Ratio of working volt to formation volt | 1:4 | 1:3 |
| Weight efficiency: | | |
| Wet cell test, µf./g | 10.2 | 15.2 |
| Finished capacitor, µf./g | 7.2 | 14.4 |
| Equivalent series resistance, ohms | 1.64 | 1.1 |
| Dissipation factor (120 $H_2$) | .025 | .008 |
| Capacitance change with frequency $C_{10 kHz.}/C_{.12 kHz.} \times 100\%$ | 80 | 99+ |
| Dissipation factor change with f $DF_{10 kHz.}/DF_{.12 kHz.} \times 100\%$ | 24 | 12+ |
| DC leakage current, µA | 1-2 | .043 |

In general it may be stated that:
1. Lower ratio of formation to operating voltage still gives leakage current level generally only about one twenty-fifth of standard anodes.
2. DC leakage distribution is very tight, see for example FIG. 3 which demonstrates exemplary uniformity of anode properties.
3. Weight efficiency is higher for cluster anodes, resulting in powder saving and size reduction, in spite of higher porosity due to micropores.
4. Dissipation factor is generally lower by a factor of about 3.
5. Change of capacitance and dissipation factor with frequency is greatly reduced. FIG. 4 gives exemplary data in this regard.

We claim:
1. A cluster anode comprising:
a plurality of film-forming metal agglomerates sintered together into a unitary porous mass, each of said agglomerates having a diameter of from 0.005 to 0.1 inches;
each of said agglomerates comprising a plurality of film-forming metal particles of 1 to 100 microns sintered together.
2. A cluster anode according to claim 1 in which said particles and agglomerates are made of tantalum.
3. A cluster anode according to claim 2 wherein the weight of the agglomerates is 0.01 to 1.0 gram.
4. A cluster anode according to claim 1 in which said anode has a formed dielectric oxide thereon.
5. A cluster anode according to claim 1 in which the average size of said powder particles is from about 1 to 50 microns.
6. A cluster anode according to claim 1 in which the average size of said agglomerates is from about 0.01 to about 0.05 inches.
7. A capacitor comprising:
a cluster anode comprising
a plurality of film-forming metal agglomerates sintered together into a unitary porous mass, each of said agglomerates having a diameter of from 0.005 to 0.1 inches;
each of said agglomerates comprising a plurality of film-forming metal particles of 1 to 100 microns sintered together;
a dielectric oxide formed on said cluster anode;
an electrolyte in contact with said dielectric oxide;
a cathode in contact with said electrolyte; and lead means for connecting said anode and said cathode into an electrical circuit.
8. A capacitor according to claim 7 in which the electrolyte is of the solid-type.
9. A capacitor according to claim 8 in which said electrolyte is manganese dioxide.
10. A capacitor according to claim 7 in which in said cluster anode said particles and agglomerates are made of tantalum.
11. A capacitor according to claim 10 in which the weight of said agglomerates is 0.01 to 1.0 grams.
12. A capacitor according to claim 7 in which said electrolyte is of the wet type.
13. A capacitor according to claim 12 in which said electrolyte is selected from acids and salts.
14. A capacitor according to claim 7 in which in said cluster anode the average size of said powder particles is from about 1 to 50 microns.
15. A capacitor according to claim 7 in which in said cluster anode the average size of said agglomerates is from about 0.01 to 1.0 grams.

* * * * *